(12) United States Patent
Maekawa et al.

(10) Patent No.: US 11,375,084 B2
(45) Date of Patent: Jun. 28, 2022

(54) MEASUREMENT METHOD FOR MEASURING A PHYSICAL PROPERTY VALUE OF LIGHT OUTPUT OF A DISPLAY DEVICE

(71) Applicant: EIZO Corporation, Hakusan (JP)

(72) Inventors: Takao Maekawa, Hakusan (JP); Kensuke Nagashima, Hakusan (JP); Atsuyoshi Deyama, Hakusan (JP); Takashi Nakagawa, Hakusan (JP); Tatsuya Nakamura, Hakusan (JP)

(73) Assignee: EIZO Corporation, Hakusan (JP)

( * ) Notice: Subject to any disclaimer, the term of this patent is extended or adjusted under 35 U.S.C. 154(b) by 16 days.

(21) Appl. No.: 17/254,451

(22) PCT Filed: Jul. 3, 2018

(86) PCT No.: PCT/JP2018/025281
§ 371 (c)(1),
(2) Date: Dec. 21, 2020

(87) PCT Pub. No.: WO2020/008543
PCT Pub. Date: Jan. 9, 2020

(65) Prior Publication Data
US 2021/0227097 A1     Jul. 22, 2021

(51) Int. Cl.
*H04N 1/60* (2006.01)
*H04N 1/00* (2006.01)
(52) U.S. Cl.
CPC .......... *H04N 1/60* (2013.01); *H04N 1/00023* (2013.01); *H04N 1/00034* (2013.01)

(58) Field of Classification Search
CPC .. H04N 1/60; H04N 1/00023; H04N 1/00034; H04N 17/04; G09G 5/02;
(Continued)

(56) References Cited

U.S. PATENT DOCUMENTS

2009/0167782 A1   7/2009  Petljanski et al.
2009/0231623 A1*  9/2009  Kuwahara .......... G06K 15/1806
                                                          358/1.15

FOREIGN PATENT DOCUMENTS

EP    0 716 312 A2     6/1996
EP    0716312 A2 *     6/1996
(Continued)

OTHER PUBLICATIONS

International Search Report dated Oct. 9, 2018 in corresponding International Application No. PCT/JP2018/025281; 5 pages.
(Continued)

*Primary Examiner* — Christopher Wait
(74) *Attorney, Agent, or Firm* — Maier & Maier, PLLC

(57) ABSTRACT

The present invention provides a measurement method capable of measuring a physical property value of light output based on a pixel value at any coordinates in an original image. According to the present invention, provided is a measurement method including a display control step of displaying a patch image generated based on a pixel value at target coordinates in the original image, on a display screen at patch display coordinates different from the target coordinates; and a measurement control step of measuring the physical property value of the light from the patch image displayed on the display screen.

7 Claims, 9 Drawing Sheets

(58) Field of Classification Search
CPC .............. G09G 5/38; G09G 2320/0693; G09G 2330/12; G09G 2340/0464; G09G 2360/145; G09G 3/006; G09G 5/00
See application file for complete search history.

(56) References Cited

FOREIGN PATENT DOCUMENTS

| | | |
|---|---|---|
| JP | 2006-333240 A | 12/2006 |
| JP | 2011-509604 A | 3/2011 |
| JP | 2013-020093 A | 1/2013 |
| JP | 2014-059353 A | 4/2014 |

OTHER PUBLICATIONS

Office Action dated Jan. 10, 2022, in connection with corresponding Indian Application No. 202117003647 (6 pp., including English translation).
Extended European Search Report dated Jul. 14, 2021, in connection with corresponding EP Application No. 18925128.3; 10 pages.

* cited by examiner

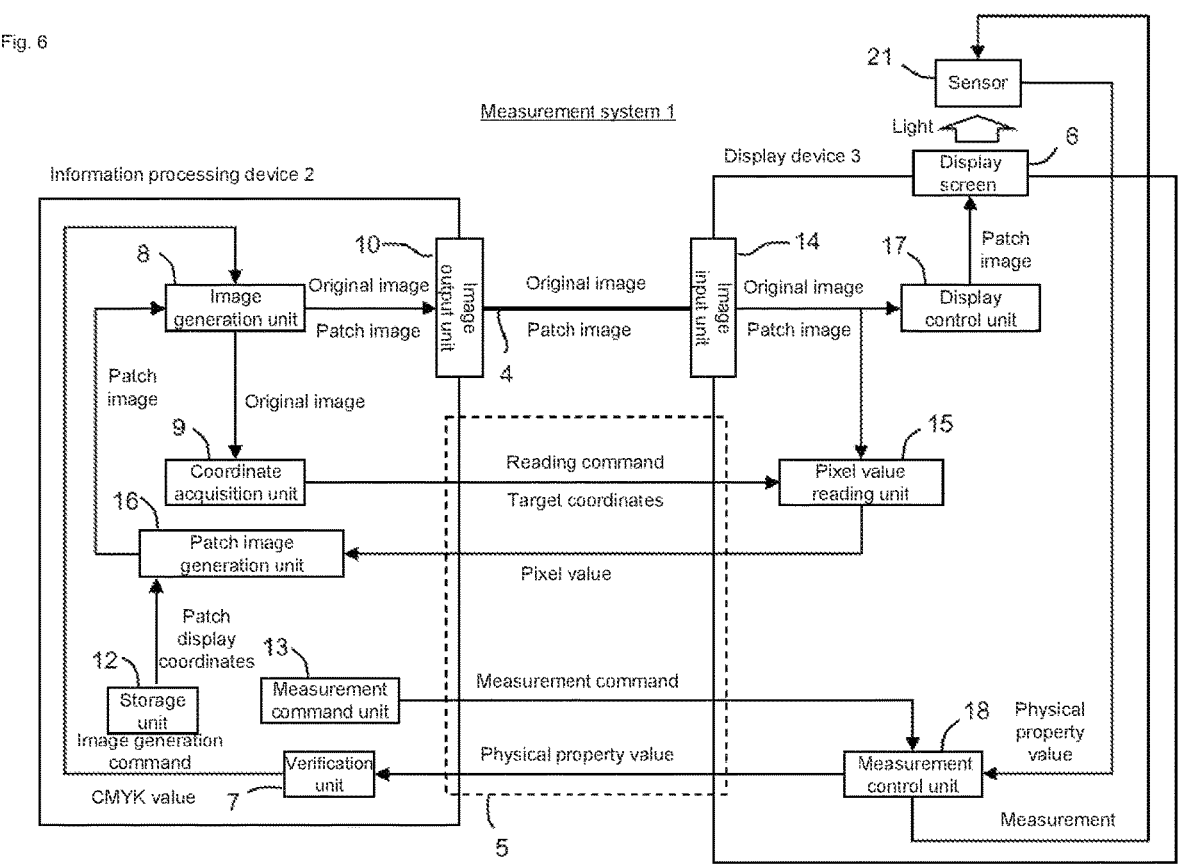

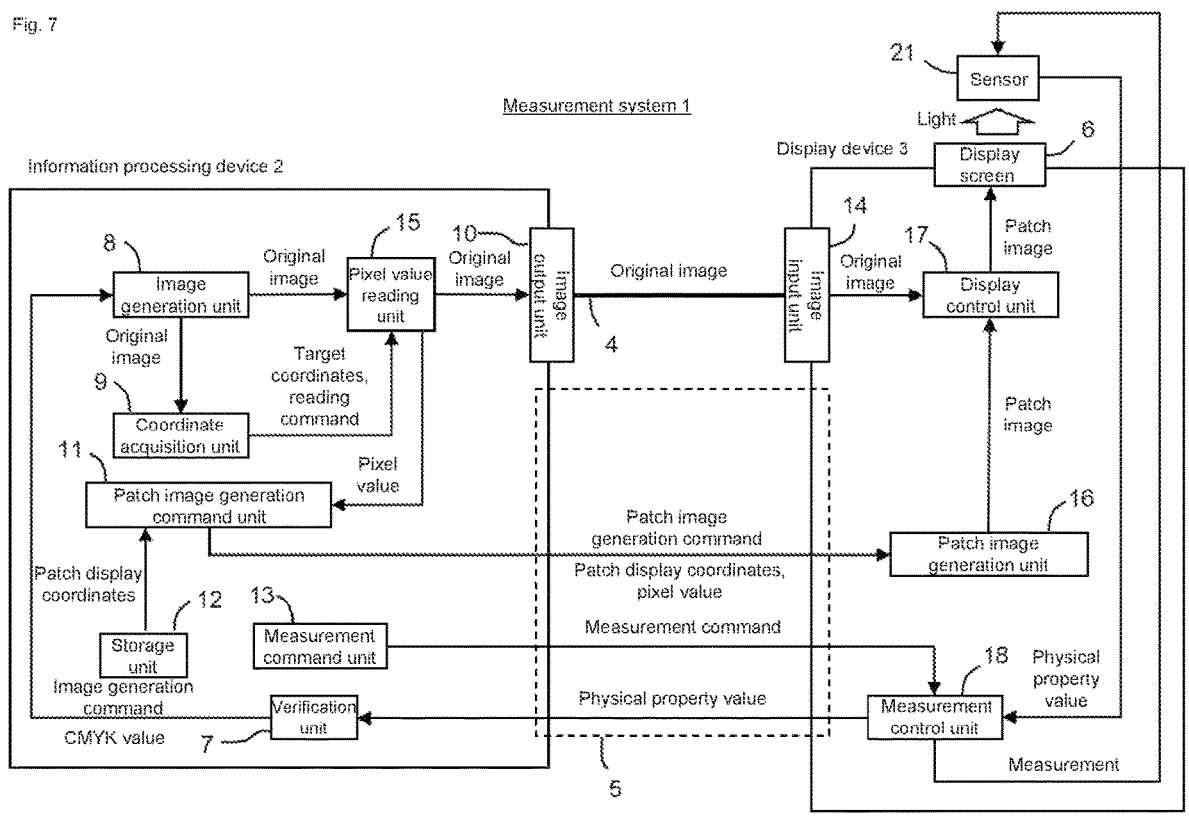

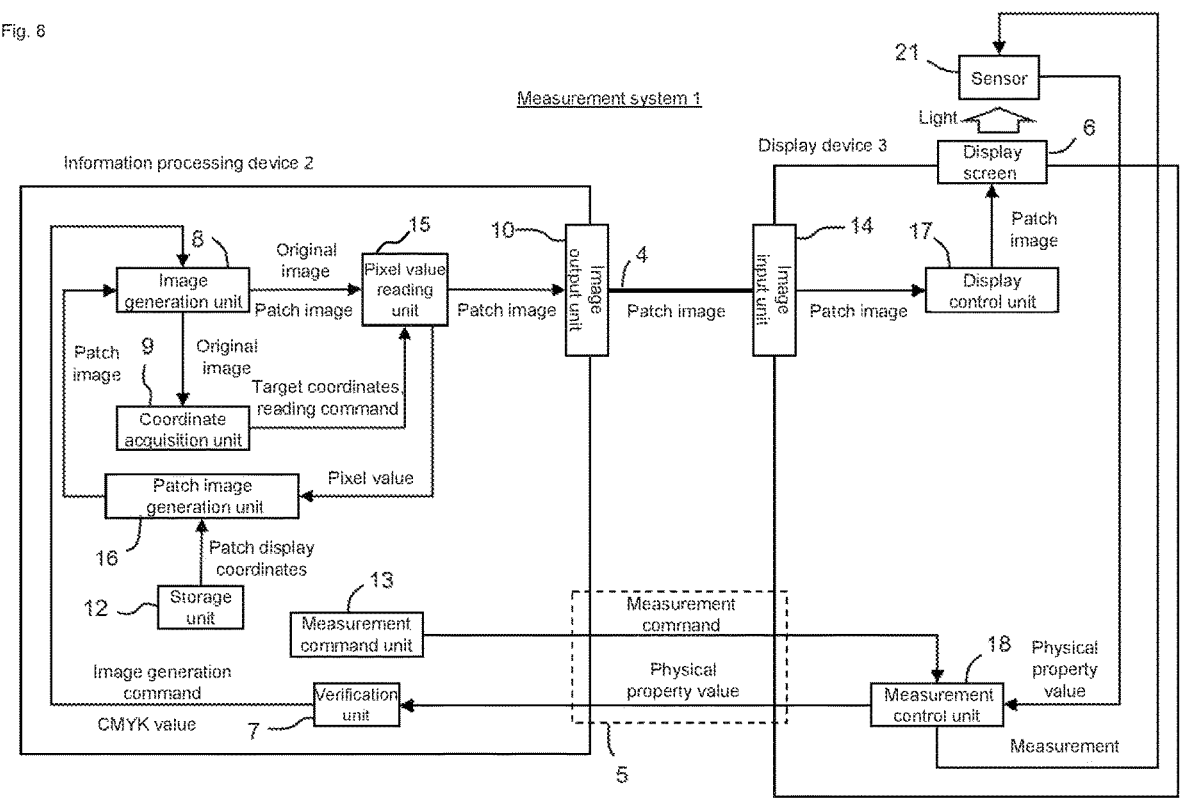

MEASUREMENT METHOD FOR MEASURING A PHYSICAL PROPERTY VALUE OF LIGHT OUTPUT OF A DISPLAY DEVICE

TECHNICAL FIELD

The present invention relates to a measurement method, a measurement system, a display device, and a computer program.

BACKGROUND ART

Images used for printing are generally represented by CMYK values. The image represented by the CMYK value is converted into an RGB value and then displayed on a screen. The conversion from the CMYK value to the RGB value is performed by image processing software or the like, and if the setting of this conversion is inaccurate, the image is not displayed in its original color. For this reason, it is necessary to verify whether the image represented by the CMYK value is displayed in its original color.

SUMMARY OF INVENTION

Technical Problem

Although some image processing software has a function of displaying color patches corresponding to specific CMYK values, some of the software cannot change a display position of the color patches by external control.

Further, although some display devices are provided with a sensor capable of measuring a physical property value that can be converted into luminance and/or chromaticity of light output from the display screen, it may be difficult to change the measurable area of such a sensor.

In such a case, the problem arises that the physical property value of the light output from the area where the color patches output by the image processing software are displayed cannot be measured.

The present invention has been made in view of such circumstances and provides a measurement method capable of measuring the physical property value of the light output based on a pixel value of any coordinates in an original image.

Solution to Problem

According to the present invention, provided is a measurement method, comprising: a display control step of displaying a patch image generated based on a pixel value at target coordinates in an original image, on a display screen at patch display coordinates different from the target coordinates; and a measurement control step of measuring a physical property value of light from the patch image displayed on the display screen.

In the present invention, the patch image generated based on the pixel value at the target coordinates in the original image is displayed on the display screen at coordinates different from the target coordinates, and the physical property value of the light output from the area where the patch image is displayed is measured. Consequently, the physical property value of the light output based on the pixel value of any coordinates in the original image can be measured.

Hereinafter, various embodiments of the present invention will be exemplified. The embodiments described below can be combined with each other.

Preferably, in the measurement method, the display control step further comprises: a coordinate acquisition step of acquiring the target coordinates; a pixel value reading step of reading out the pixel value at the target coordinates; and a patch image generation step of generating the patch image based on the pixel value, and, in the display control step, the patch image is displayed on the display screen.

Preferably, the measurement method is performed in a measurement system comprising an information processing device and a display device configured to be able to communicate with each other, the display screen is provided on the display device, the original image is generated in the information processing device, and the coordinate acquisition step is performed by any one of the information processing device and the display device.

Preferably, in the measurement method, the pixel value reading step and/or the patch image generation step is performed by the information processing device.

Preferably, in the measurement method, the pixel value reading step and/or the patch image generation step is performed by the display device.

Preferably, in the measurement control step of the measurement method, the physical property value is measured by a sensor included in the display device.

Preferably, in the measurement method, the pixel value is a RGB value generated by converting a CMYK value, and the measurement method further comprises a verification step of verifying whether luminance and/or chromaticity determined according to the physical property value is a value corresponding, in a specific standard, to the CMYK value.

Preferably, a computer program for causing a computer to perform the measurement method is provided.

Preferably, provided is a measurement system comprising: a display screen; a display control unit; a measurement control unit; and a sensor, wherein the display control unit is configured to display a patch image generated based on a pixel value at target coordinates in an original image, on the display screen at coordinates different from the target coordinates, and the measurement control unit is configured to measure, with the sensor, a physical property value of light output from a region where the patch image is displayed.

Preferably, the measurement system further comprises a coordinate acquisition unit configured to acquire the target coordinates, a pixel value reading unit configured to acquire the pixel value at the target coordinates, and a patch image generation unit configured to generate the patch image based on the pixel value, wherein the display control unit is configured to display the patch image on the display screen.

Preferably, the measurement system further comprises an information processing device and a display device configured to be able to communicate with each other, wherein the display screen is provided on the display device, the original image is generated in the information processing device, and the coordinate acquisition unit is provided on any one of the information processing device and the display device.

Preferably, provided is a display device, comprising: a display screen; a display control unit; a measurement control unit; and a sensor, wherein the display control unit is configured to display a patch image generated based on a pixel value at target coordinates in an original image, on the display screen at coordinates different from the target coordinates; and the measurement control unit is configured to measure, with the sensor, a physical property value of light output from a region where the patch image is displayed.

BRIEF DESCRIPTION OF DRAWINGS

FIG. 6 is a functional block diagram of the measurement system 1 of a third embodiment of the present invention.

FIG. 7 is a functional block diagram of the measurement system 1 of a fourth embodiment of the present invention.

FIG. 8 is a functional block diagram of the measurement system 1 of a fifth embodiment of the present invention.

DESCRIPTION OF EMBODIMENTS

Hereinafter, embodiments of the present invention will be described with reference to the drawings. Various characteristics described in the embodiments below can be combined with each other. Further, the invention is independently established for each characteristic.

1. First Embodiment

Figure 1:
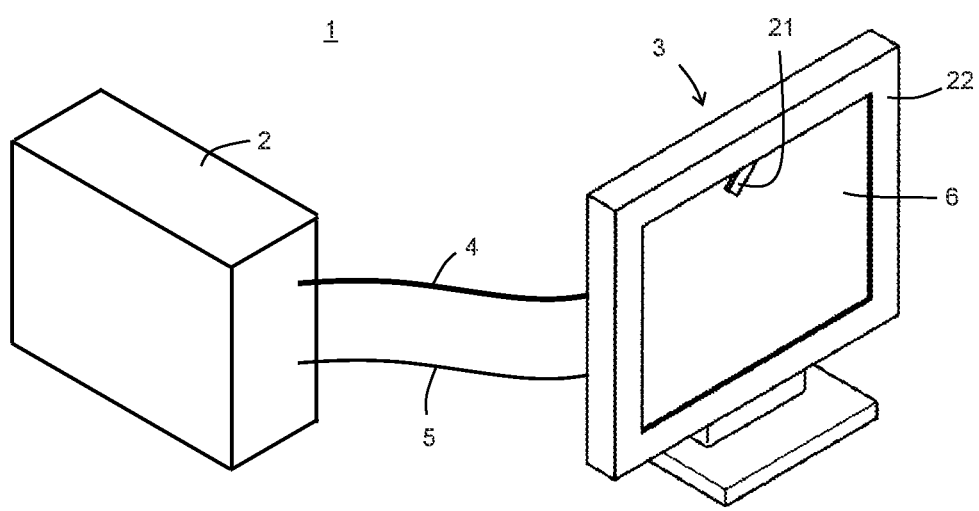
FIG. 1 is a perspective view showing the configuration of a measurement system 1 of a first embodiment of the present invention.

A measurement system 1 of a first embodiment of the present invention will be described with reference to FIG. 1 and FIG. 2. As shown in FIG. 1, the measurement system 1 includes an information processing device 2 and a display device 3. The information processing device 2 and the display device 3 are configured to be able to communicate with each other via a video signal cable 4 and a control signal cable 5. A video signal from the information processing device 2 is transmitted to the display device 3 through the video signal cable 4, and video based on this video signal is displayed on a display screen 6 of the display device 3. A control signal and data are exchanged between the information processing device 2 and the display device 3 through the control signal cable 5.

Figure 3:
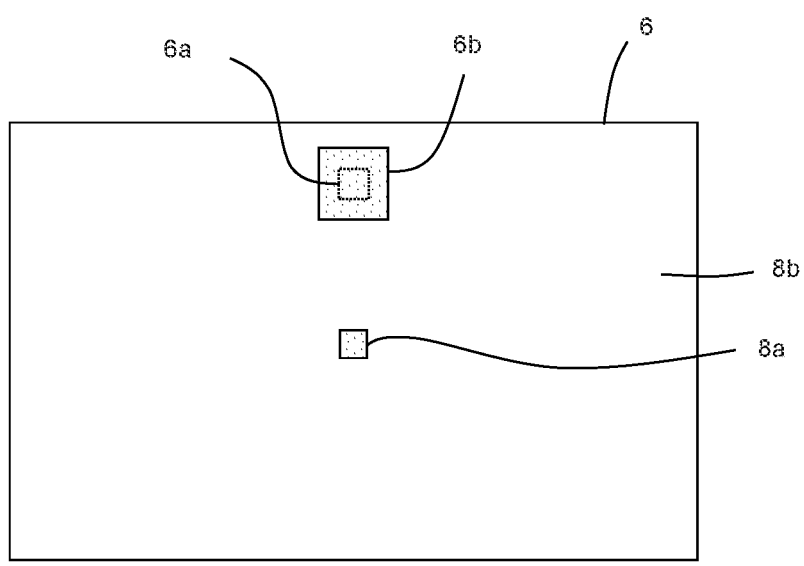
FIG. 3 is a diagram for explaining the relationship among an original patch image 8a, an original image 8b, a measurement region 6a, and a patch image 6b on a display screen 6.

The display device 3 includes a built-in sensor 21. The sensor 21 is configured to measure a physical property value of light output from a specific measurement region 6a (see FIG. 3) in the display screen 6. Examples of the physical property value include physical quantities, such as light intensity, and values that can be converted into luminance and/or chromaticity, such as psychophysical quantities, for example, X, Y, Z stimulus values. The luminance and/or chromaticity can be represented in the Lab color space.

The display screen 6 is surrounded by a frame 22, and the sensor 21 can be moved into and out of the frame 22. During the measurement, the sensor 21 is moved so that a light-receiving surface of the sensor 21 can face the measurement region 6a in the display screen 6. After the measurement is completed, the sensor 21 is moved into the frame 22. In this way, the sensor 21 is accommodated in the frame 22 when the measurement is not performed, so that it is possible to prevent the sensor 21 from covering the display screen 6 while the display device 3 is used.

Figure 2:
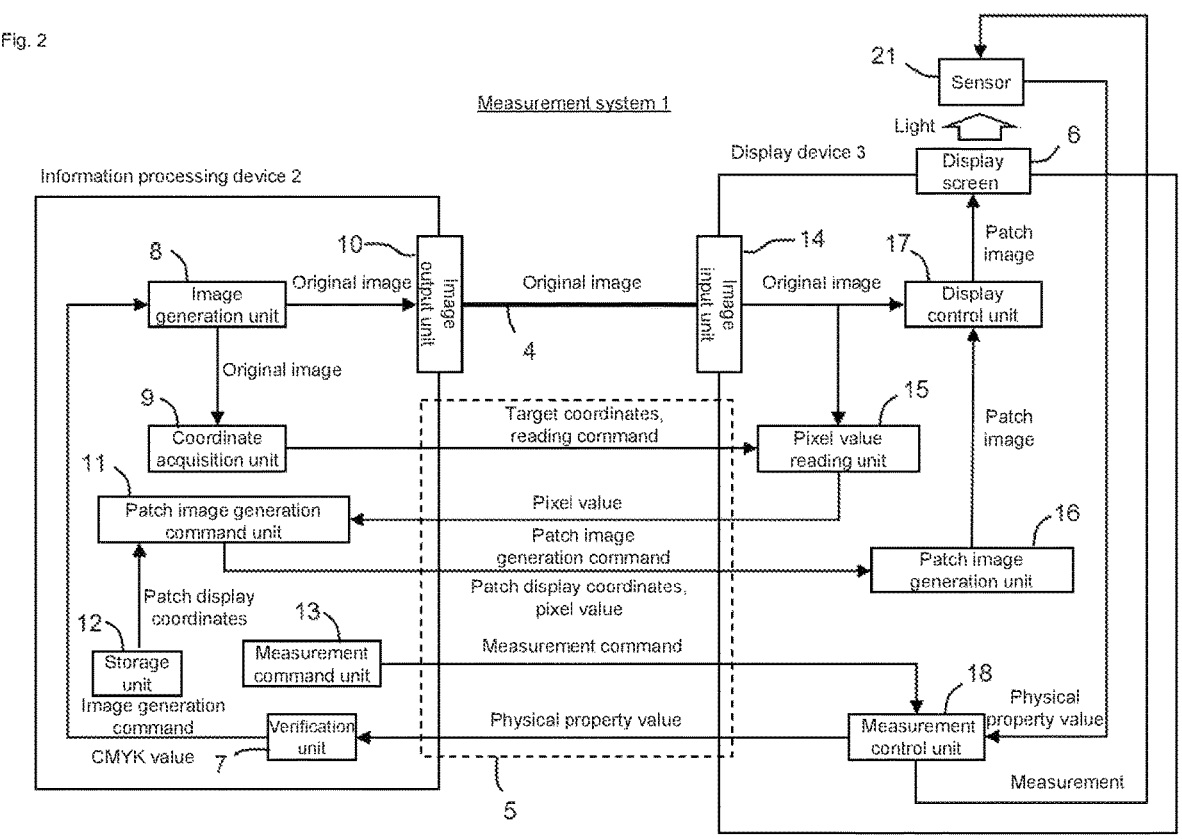
FIG. 2 is a functional block diagram of the measurement system 1 in FIG. 1.

The information processing device 2 and the display device 3 include various functional blocks shown in FIG. 2. Specifically, the information processing device 2 includes a verification unit 7, an image generation unit 8, a coordinate acquisition unit 9, an image output unit 10, a patch image generation command unit 11, a storage unit 12, and a measurement command unit 13. The display device 3 includes an image input unit 14, a pixel value reading unit 15, a patch image generation unit 16, a display control unit 17, and a measurement control unit 18.

The functional blocks included in the information processing device 2 and the display device 3 may be realized by software or hardware. When realized by software, each function can be realized by causing CPU to execute a computer program. The program may be stored in built-in memory or a non-transitory computer-readable medium. Alternatively, the above functions may be realized by reading out a program stored in external memory using so-called cloud computing. When realized by hardware, each function can be realized by various circuits, such as ASIC, FPGA, or DRP. The present embodiment deals with various information and concepts including the information. These may be a bit group of binary numbers having 0 or 1 represented according to the level of signal values. The communication and calculation can be executed according to configurations of the above software and hardware.

Figure 4:
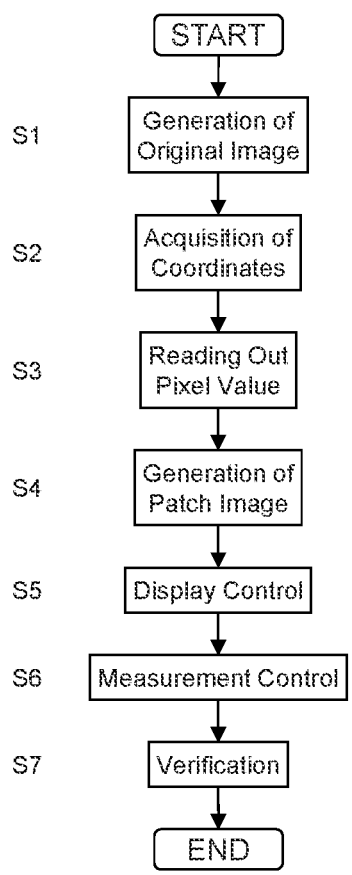
FIG. 4 is a flowchart of a measurement method of the first embodiment of the present invention.

A measurement method using the measurement system 1 will be described in detail with reference to the flowchart in FIG. 4. Hereinafter, the explanation will be given with an example of verifying whether the luminance and/or chromaticity (e.g., Lab value) determined by the physical property value measured by the sensor 21 is a value corresponding to a CMYK value in a specific standard (hereinafter, CMYK verification). Examples of the standard include ISO12642-2.

1-1. Original Image Generation Step S1

In an original image generation step S1, the verification unit 7 outputs a command for the image generation unit 8 to generate an image for the specified CYMK value. The image generation unit 8 is a functional block, for example, composed of commercially available image processing software (e.g., Adobe Photoshop (registered trademark)), and is configured to convert the CYMK value into a RGB value and generate an original image 8b including an original patch image 8a having the RGB value. The original image 8b is an image having a size corresponding to the entire display screen 6. The original patch image 8a is an image composed of one or a plurality of pixels and having a size corresponding to a part of the display screen 6. The original patch image 8a is arranged in a window in one example. Even though this window can be moved manually, it is cumbersome to move it manually. Further, if the window has a menu bar, it may be difficult to move the original patch image 8a to the measurement region 6a.

If the above conversion is properly performed and the display device 3 is properly calibrated, the luminance and/or chromaticity of the light output from the original patch image 8a will be a value corresponding to the above CYMK value. In practice, however, the light having the luminance and/or chromaticity corresponding to the above CYMK value may not be output due to inadequate conversion settings or calibration. Therefore, the CMYK verification is needed.

If the original patch image 8a can be generated in the measurement region 6a measured by the sensor 21, the physical property value of the light from the original patch image 8a can be easily measured. However, the generation position of the original patch image 8a may not be externally controlled, and the original patch image 8a may be generated outside the measurement region 6a (for example, in the center of the display screen 6). In such a case, it is difficult to measure the light from the original patch image 8a with the sensor 21. The present invention provides a technique that enables the CMYK verification even in such a case.

The image generation unit 8 may output only the original patch image 8a as the original image 8b or may output an image, as the original image 8b, in which the original patch image 8a is superimposed on an image displayed on the display screen 6 immediately before the original patch image 8a is generated.

The original image 8b is output from the image output unit 10 to the outside, transmitted through the video signal cable 4, and then input to the display device 3 from the image input unit 14. Further, when the coordinate acquisition unit 9 uses the original image 8b to acquire the target coordinates, the original image 8b is also input to the coordinate acquisition unit 9.

1-2. Coordinate Acquisition Step S2

In a coordinate acquisition step S2, the coordinate acquisition unit 9 acquires the target coordinates. The target coordinates are coordinates for which a pixel value is acquired in a pixel value reading step S3. In the present embodiment, the coordinates in the original patch image 8a are acquired as the target coordinates. A method of acquiring the target coordinates is not limited, and examples thereof include the following methods.

When the original patch image 8a is disposed in the window, a method of acquiring the coordinates indicating the position of the window (for example, the coordinates indicating the upper left point of the window) and calculating the target coordinates based on the acquired coordinates can be adopted.

A method in which a user specifies the target coordinates with a pointer, keyboard, and the like A method in which the verification unit specifies the target coordinates A method in which the coordinate acquisition unit 9 reads out the target coordinates stored in the storage unit 1-3. Pixel Value Reading Step S3

In the pixel value reading step S3, the coordinate acquisition unit 9 outputs a command for the pixel value reading unit 15 to read out the pixel value at the specified target coordinates. The target coordinates and the reading command are transmitted from the information processing device 2 to the display device 3. The original image 8b is input to the pixel value reading unit 15 through the image input unit 14, and the pixel value at the target coordinates in the original image 8b is read out. The pixel value is, for example, a value represented by an RGB value.

1-4. Patch Image Generation Step S4

In a patch image generation step S4, the pixel value reading unit 15 transmits the pixel value to the patch image generation command unit 11. The patch image generation command unit 11 reads out patch display coordinates from the storage unit 12 and outputs a command for the patch image generation unit 16 to generate a patch image for the specified patch display coordinates and the specified pixel value. The patch image generation unit 16 generates a patch image 6b of the specified pixel value based on the patch display coordinates. The patch image 6b is preferably generated to overlap the measurement region 6a measured by the sensor 21. The patch display coordinates may be specified by a user with a pointer, a keyboard, or the like, instead of being read out from the storage unit 12. In this regard, the storage unit 12 may be arranged in either the information processing device 2 or the display device 3 or may be arranged on the network. The same applies to a second and subsequent embodiments.

1-5. Display Control Step S5

In a display control step S5, the display control unit 17 displays the patch image 6b generated in the step S4 on the display screen 6. The display control unit 17 may display only the patch image 6b or may display the patch image 6b superimposed on the original image 8b.

1-6. Measurement Control Step S6

In a measurement control step S6, the measurement command unit 13 outputs a command for the measurement control unit 18 to measure a physical property value of the light from the patch image 6b. The measurement control unit 18 measures the physical property value by the sensor 21 based on this command. In the present embodiment, the measurement control unit 18 receives X, Y, Z stimulus values as the physical property value from the sensor 21.

1-7. Verification Step S7

In a verification step S7, the verification unit 7 receives the physical property value (X, Y, Z stimulus values) from the measurement control unit 18 and converts this physical property value into luminance and/or chromaticity (e.g., Lab value). Alternatively, the measurement control unit 18 may perform this conversion, and the verification unit 7 may receive the converted value.

The verification unit 7 verifies whether the luminance and/or chromaticity is a value corresponding, in a specific standard, to the CYMK value specified in the original image generation step S1. Table 1 shows the relationship between the CYMK value and the Lab value for some examples cited from ISO 12642-2. When the CYMK values specified in the step S1 are (40, 100, 100, 20), the Lab values according to the standard are (38.56, 20.76, 6.46). If the difference between the Lab value converted from the physical property value and the Lab value according to the standard described above is within an error range defined by the standard, it is verified that the CYMK value and the Lab value converted from the physical property value have a relationship in accordance with the standard. On the other hand, if the difference is out of the error range defined by the standard, there would be a problem that the conversion settings in the image processing software are inadequate or the display device 3 is not properly calibrated, and thus it is preferable to perform the verification again after resolving such problems. In this regard, the display device 3 may be calibrated based on the data obtained in the verification step S7.

TABLE 1

| C | Y | M | K | L | a | b |
|---|---|---|---|---|---|---|
| 40 | 100 | 100 | 20 | 38.56 | 20.76 | 6.46 |
| 70 | 0 | 100 | 20 | 52.08 | −25.47 | 17.93 |
| 70 | 10 | 100 | 20 | 49.67 | −20.72 | 15.39 |
| 70 | 20 | 100 | 20 | 47.46 | −16.32 | 13.08 |
| 70 | 40 | 100 | 20 | 43.45 | −8.23 | 8.93 |
| 70 | 70 | 100 | 20 | 38.84 | 1.77 | 4.32 |
| 70 | 100 | 100 | 20 | 35.34 | 9.53 | 0.93 |

ISO12642-2 defines the relationship between 1617 types of CYMK values and Lab values. It is preferable to perform the steps S1 to S7 for a plurality of CYMK values, and it is preferable to perform the steps S1 to S7 for all CYMK values. In such a case, it is preferable to collectively output the verification results after the verification of all the CYMK values to be verified is completed.

2. Second Embodiment

Figure 5:
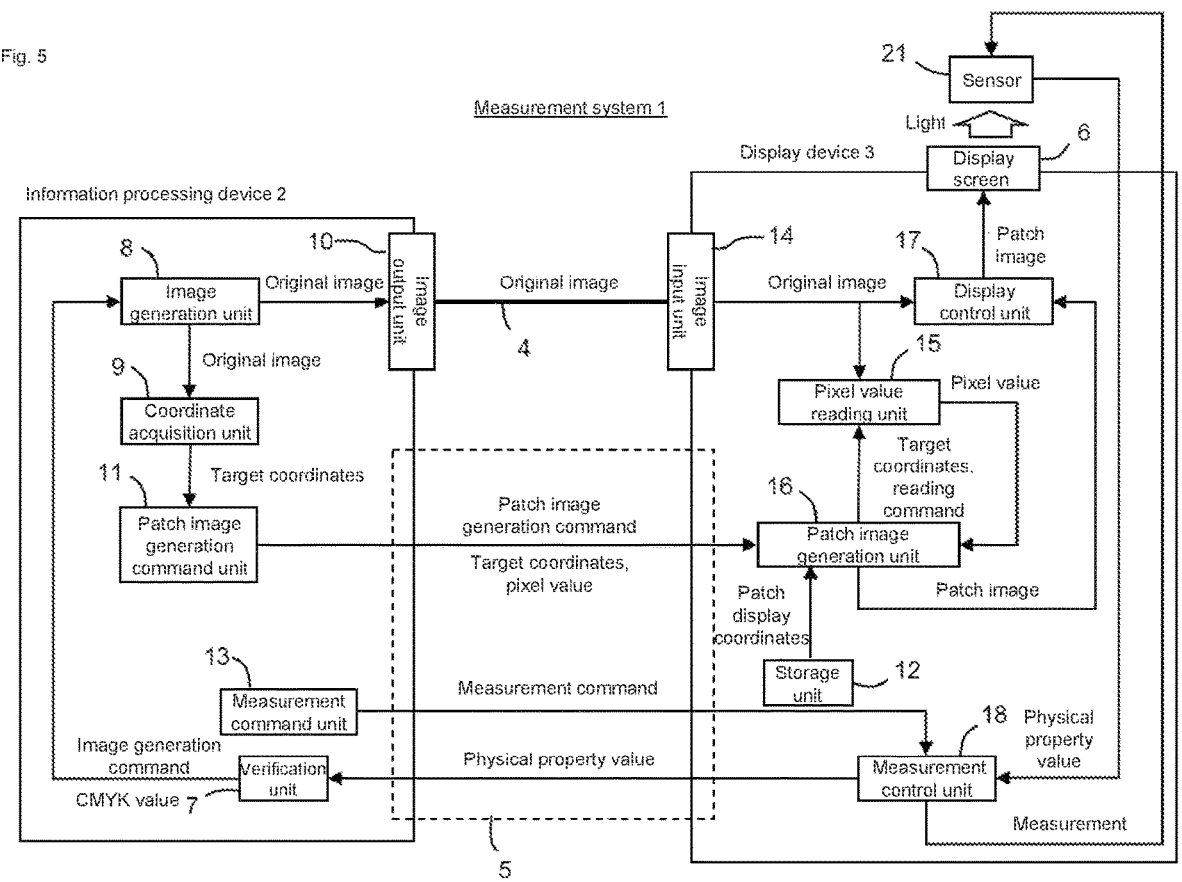
FIG. 5 is a functional block diagram of the measurement system 1 of a second embodiment of the present invention.

The measurement system 1 of a second embodiment of the present invention will be described with reference to FIG. 5. The present embodiment is similar to the first embodiment, and the main difference is that the pixel value read out by the pixel value reading unit 15 is directly transmitted to the patch image generation unit 16. Hereinafter, a measurement method using the measurement system 1 of the present embodiment will be described with emphasis on the difference.

2-1. Original Image Generation Step S1

The original image generation step S1 is performed in the same manner as in the first embodiment.

2-2. Coordinate Acquisition Step S2

In the coordinate acquisition step S2, the coordinate acquisition unit 9 acquires the target coordinates in the same manner as in the first embodiment. The acquired target coordinates are transmitted to the patch image generation command unit 11.

2-3. Pixel Value Reading Step S3 and Patch Image Generation Step S4

In the pixel value reading step S3 and the patch image generation step S4, the patch image generation command unit 11 outputs a command for the patch image generation unit 16 to generate a patch image for the specified target coordinates and the target pixel value.

The patch image generation command unit 11 outputs a command for the pixel value reading unit 15 to read out a pixel value for the specified target coordinates. The pixel value reading unit 15 reads out the pixel value in the same manner as in the first embodiment and transmits the pixel value to the patch image generation unit 16.

The patch image generation unit 16 generates the patch image 6b in the same manner as in the first embodiment.

2-4. Display Control Step S5 to Verification Step S7

The display control step S5 to the verification step S7 are performed in the same manner as in the first embodiment.

3. Third Embodiment

The measurement system 1 of a third embodiment of the present invention will be described with reference to FIG. 6. The present embodiment is similar to the first embodiment, and the main difference is that the patch image generation unit 16 is disposed in the information processing device 2. Hereinafter, a measurement method using the measurement system 1 of the present embodiment will be described with emphasis on the difference.

3-1. Original Image Generation Step S1

The original image generation step S1 is performed in the same manner as in the first embodiment.

3-2. Coordinate Acquisition Step S2

In the coordinate acquisition step S2, the coordinate acquisition unit 9 acquires the target coordinates in the same manner as in the first embodiment.

3-3. Pixel Value Reading Step S3

In the pixel value reading step S3, the pixel value reading unit 15 reads out a pixel value in the same manner as in the first embodiment and transmits the read pixel value to the patch image generation unit 16.

3-4. Patch Image Generation Step S4

In the patch image generation step S4, the patch image generation unit 16 reads out patch display coordinates from the storage unit 12 and generates the patch image 6b of the specified pixel value based on the patch display coordinates.

The image generation unit 8 generates and outputs an image in which the patch image 6b is superimposed on the original image 8b. The generated image is transmitted through the video signal cable 4 and input to the display control unit 17. The image generation unit 8 may be configured to output only the patch image 6b.

3-5. Display Control Step S5 to Verification Step S7

The display control step S5 to the verification step S7 are performed in the same manner as in the first embodiment.

4. Fourth Embodiment

The measurement system 1 of a fourth embodiment of the present invention will be described with reference to FIG. 7. The present embodiment is similar to the first embodiment, and the main difference is that the pixel value reading unit 15 is disposed in the information processing device 2. Hereinafter, a measurement method using the measurement system 1 of the present embodiment will be described with emphasis on the difference.

4-1. Original Image Generation Step S1

The original image generation step S1 is performed in the same manner as in the first embodiment.

4-2. Coordinate Acquisition Step S2

In the coordinate acquisition step S2, the coordinate acquisition unit 9 acquires the target coordinates in the same manner as in the first embodiment.

4-3. Pixel Value Reading Step S3

In the pixel value reading step S3, the coordinate acquisition unit 9 outputs a command for the pixel value reading unit 15 to read out the pixel value at the specified target coordinates. The pixel value reading unit 15 is disposed between the image generation unit 8 and the image output unit 10. The original image 8b is input to the pixel value reading unit 15, and the pixel value at the target coordinates in the original image 8b is read out.

4-4. Patch Image Generation Step S4

In the patch image generation step S4, the pixel value reading unit 15 transmits the pixel value to the patch image generation command unit 11. The patch image generation command unit 11 and the patch image generation unit 16 generate the patch image 6b in the same manner as in the first embodiment.

4-5. Display Control Step S5 to Verification Step S7

The display control step S5 to the verification step S7 are performed in the same manner as in the first embodiment.

5. Fifth Embodiment

The measurement system 1 of a fifth embodiment of the present invention will be described with reference to FIG. 8. The present embodiment is similar to the third and fourth embodiments, and the main difference is that both of the pixel value reading unit 15 and the patch image generation unit 16 are disposed in the information processing device 2. Hereinafter, a measurement method using the measurement system 1 of the present embodiment will be described with emphasis on the difference.

5-1. Original Image Generation Step S1 to Pixel Value Reading Step S3

The original image generation step S1 to the pixel value reading step S3 are performed in the same manner as in the fourth embodiment.

5-2. Patch Image Generation Step S4 to Verification Step S7

The patch image generation step S4 to the verification step S7 are performed in the same manner as in the third embodiment.

6. Other Embodiments

The information processing device 2 and the display device 3 may be integrally configured.

Figure 9A:
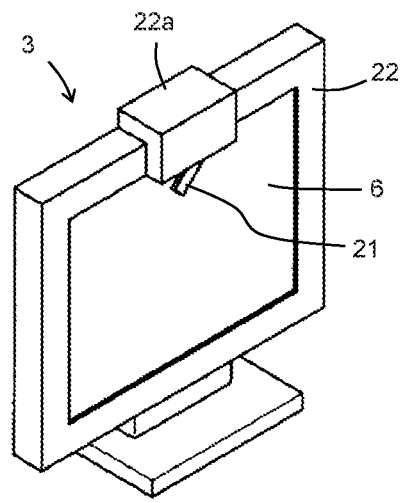
FIG. 9A and FIG. 9B are perspective views showing modified examples of the configuration of a sensor 21.

As shown in FIG. 9A, the sensor 21 may be configured to be moved into and out of a retrofitted frame 22*a* attached to the frame 22.

Figure 9B:
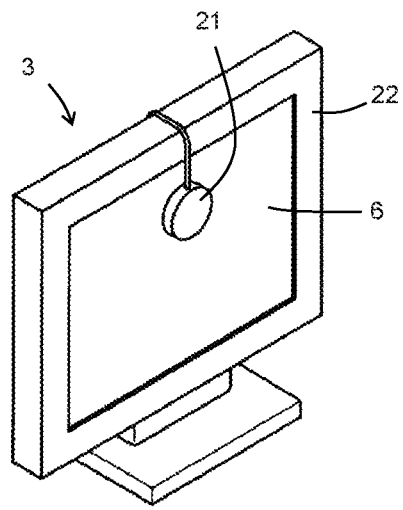

As shown in FIG. 9B, the sensor 21 may be configured to be suspended from the frame 22 and supported. Although the measurement region 6*a* can be moved in this case, it is significant to apply the present invention because the display position of the original patch image 8*a* may be outside a movable range of the measurement region 6*a*.

The original patch image 8*a* may be displayed near an edge of the display screen 6, depending on the specifications of the image generation unit 8. In this case, the retrofitted sensor 21, as shown in FIG. 9B, may interfere with the frame 22 and may not be able to be installed in a proper position and a proper orientation. In such a case, appropriate measurement can be performed by displaying the patch image 6*b* away from the edge of the display screen 6.

The sensor 21 may be fixed. For example, the sensor 21 may be disposed at a position where the sensor 21 always overlaps the display screen 6. Further, the sensor 21 may be fixed in the frame 22 and configured to detect the light from the display screen 6 through a hole provided on the frame 22. In such a case, a light collection lens may be disposed in the frame 22.

The present invention can be used for applications other than the CMYK verification and can be applied to the measurement of the physical property value of the light having an RGB value of any pixel displayed on the display screen 6.

The coordinate acquisition unit 9 may be disposed in the display device 3, so that the coordinate acquisition step can be performed by the display device 3. For example, if the display screen 6 of the display device 3 is a touch screen, the coordinates of the position at which a user touches the display screen 6 can be acquired.

REFERENCE SIGNS LIST

1: measurement system, 2: information processing device, 3: display device, 4: video signal cable, 5: control signal cable, 6: display screen, 6*a*: measurement region, 6*b*: patch image, 7: verification unit, 8: image generation unit, 8*a*: original patch image, 8*b*: original image, 9: coordinate acquisition unit, 10: image output unit, 11: patch image generation command unit, 12: storage unit, 13: measurement command unit, 14: image input unit, 15: pixel value reading unit, 16: patch image generation unit, 17: display control unit, 18: measurement control unit, 21: sensor, 22: frame, 22*a*: retrofitted frame

The invention claimed is:

1. A measurement method, comprising:
   a coordinate acquisition step of acquiring target coordinates in an original image;
   a pixel value reading step of reading out a pixel value at the target coordinates;
   a patch image generation step of generating a patch image based on the pixel value;
   a display control step of displaying the patch image on a display screen at patch display coordinates different from the target coordinates; and
   a measurement control step of measuring a physical property value of light from the patch image displayed on the display screen,
   wherein the measurement method is performed in a measurement system comprising an information processing device and a display device configured to be able to communicate with each other,
   the display screen is provided on the display device,
   the original image is generated in the information processing device,
   the coordinate acquisition step is performed by any one of the information processing device and the display device,
   in the measurement control step, the physical property value is measured by a sensor, and
   the sensor is included in the display device, or is configured to be moved into and out of a retrofitted frame attached to a frame surrounding the display screen, or is configured to be suspended from the frame.

2. The measurement method of claim 1,
   wherein the pixel value reading step and/or the patch image generation step is performed by the information processing device.

3. The measurement method of claim 1,
   wherein the pixel value reading step and/or the patch image generation step is performed by the display device.

4. The measurement method of claim 1,
   wherein the pixel value is a RGB value generated by converting a CMYK value, and
   the measurement method further comprises a verification step of verifying whether luminance and/or chromaticity determined according to the physical property value is a value corresponding, in a specific standard, to the CMYK value.

5. A non-transitory computer-readable storage medium storing a computer program for causing a computer to perform the measurement method of claim 1.

6. A measurement system comprising:
   a display screen;
   a display control unit;
   a measurement control unit; and
   a sensor;
   a coordinate acquisition unit;
   a pixel value reading unit; and
   a patch image generation unit,
   wherein the coordinate acquisition unit is configured to acquire target coordinates in an original image,
   the pixel value reading unit is configured to acquire a pixel value at the target coordinates,
   the patch image generation unit is configured to generate a patch image based on the pixel value,
   the display control unit is configured to display the patch image on the display screen at coordinates different from the target coordinates,
   the measurement control unit is configured to measure, with the sensor, a physical property value of light output from a region where the patch image is displayed,
   the measurement system comprises an information processing device and a display device configured to be able to communicate with each other, the display screen is provided on the display device,
the original image is generated in the information processing device,
the coordinate acquisition unit is provided on any one of the information processing device and the display device, and
the sensor is included in the display device, or is configured to be moved into and out of a retrofitted frame attached to a frame surrounding the display screen, or is configured to be suspended from the frame.

7. A display device, comprising:
a display screen;
a display control unit;
a measurement control unit; and
a sensor;
a coordinate acquisition unit;
a pixel value reading unit; and
a patch image generation unit,
wherein the coordinate acquisition unit is configured to acquire target coordinates in an original image,
the pixel value reading unit is configured to acquire a pixel value at the target coordinates,
the patch image generation unit is configured to generate a patch image based on the pixel value,
the display control unit is configured to display the patch image on the display screen at coordinates different from the target coordinates,
the measurement control unit is configured to measure, with the sensor, a physical property value of light output from a region where the patch image is displayed,
the display device is configured to be able to communicate with an information processing device,
the original image is generated in the information processing device and
the sensor is included in the display device, or is configured to be moved into and out of a retrofitted frame attached to a frame surrounding the display screen, or is configured to be suspended from the frame.

* * * * *